G. V. TOMAN.
CLOSET TANK FLUSH VALVE.
APPLICATION FILED FEB. 2, 1916.
1,223,534.
Patented Apr. 24, 1917.
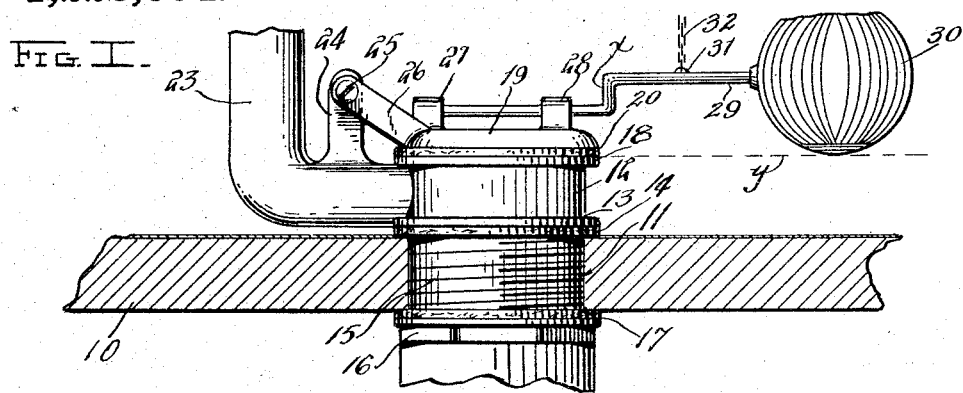
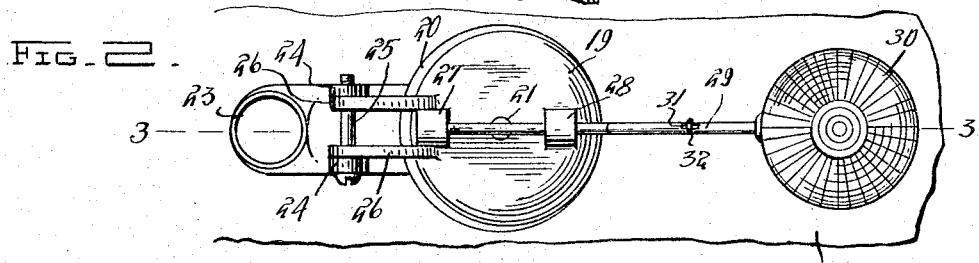
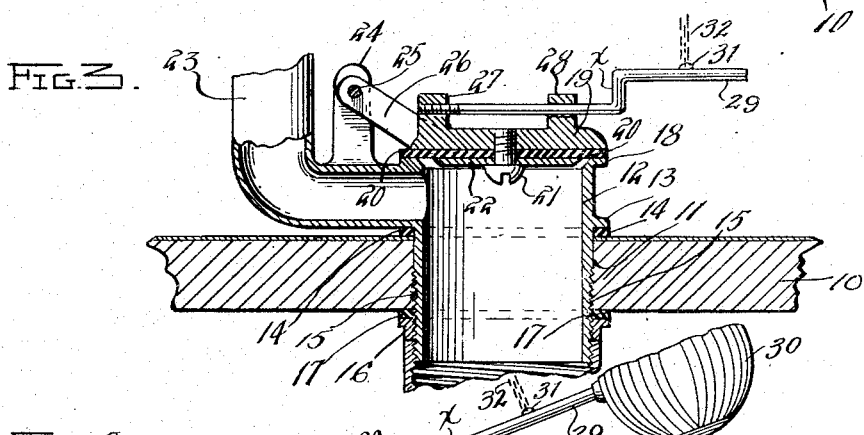
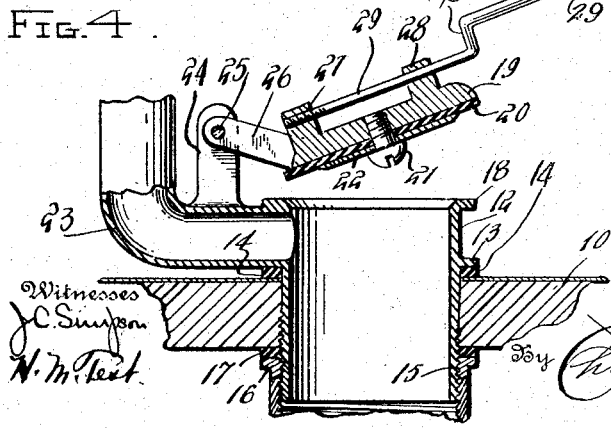
Inventor
G. V. Toman.

UNITED STATES PATENT OFFICE.

GEORGE V. TOMAN, OF BOUNDBROOK, NEW JERSEY.

CLOSET-TANK FLUSH-VALVE.

1,223,534.  Specification of Letters Patent.  Patented Apr. 24, 1917.

Application filed February 2, 1916. Serial No. 75,740.

*To all whom it may concern:*

Be it known that I, GEORGE V. TOMAN, a citizen of the United States, residing at Boundbrook, in the county of Somerset, State of New Jersey, have invented certain new and useful Improvements in Closet-Tank Flush-Valves; and I do hereby declare the following to be a full, clear, and exact description of the invention, such as will enable others skilled in the art to which it appertains to make and use the same.

This invention relates to improvements in valves, and particularly to valves used in closet flush tanks.

One object of the invention is to provide a novel and efficient valve particularly adapted to take the place of the usual rubber ball or cup valve.

Another object is to provide a flush valve which is adapted to be raised in any well known manner, but which will remain open when so moved and only closed as the level of the water in the tank falls.

Other objects and advantages will be apparent from the following description when taken in connection with the accompanying drawing.

In the drawing:

Figure 1 is an elevation of my improved valve in normal or closed position; connected parts of the tank being shown in section;

Fig. 2 is a top plan view of the valve;

Fig. 3 is a section on the line 3—3 of Fig. 2;

Fig. 4 is a section on the same line as Fig. 3, but showing the valve in open position.

Referring particularly to the accompanying drawing, 10 represents the bottom wall of a flush tank in which is formed an opening 11. Disposed through this opening is a cylindrical metal casing 12, having a peripherally arranged and circumferentially extending flange 13 disposed above the bottom wall and resting on a washer 14 encircling the casing and disposed against the upper face of the bottom wall. The lower portion of the casing is threaded as shown at 15 and has engaged thereon, below the bottom wall, a nut 16 for lower face of the bottom wall, a nut 16 for engagement with the washer 17, similar to the washer 14 and engaged around the casing as clearly shown. Thus between the washers 14 and 17, and the flange 13 and nut 16, the casing is firmly clamped in the opening in the bottom of the tank, and a water-proof joint formed. The upper end of the casing has a peripheral flange or lip 18, and engaged on the said flange is a valve disk 19, the lower face of which has a washer disk 20 secured thereto by means of the removable screw 21. A metal plate 22 is disposed between the head of the screw and the washer so that the middle portion of the washer will be held rigid and only the peripheral edge portion permitted to flex to any degree. Forming a part of the casing and extending laterally from one side, and then vertically is an overflow pipe 23. Formed on the horizontal portion of the overflow pipe is a pair of vertically extending and apertured ears 24 through which extends a bolt 25 and on which are pivotally engaged a pair of ears 26 formed integrally with the valve disk 19. A pair of lugs 27 and 28 extend vertically from two diametrically opposite points on the upper face of the disk 19 and receive therethrough a rod 29 which has its inner end threaded for engagement in the threaded opening in the lug 27. The outer end of this rod, which is disposed a suitable distance from the valve casing, has secured thereto a ball float 30. Formed on the rod adjacent the ball is a loop 31 to which is connected one end of a chain 32, and which chain is connected to any well known operating device (not shown) which is in common use for actuating the flush valve of a tank of this character.

The disk or head 19 is so weighted with relation to the lifting power of the float 30 that when the valve disk or head 19 is seated, the weight of the water thereon and the suction set up in the flush pipe 12 overcomes the lifting power of the float, but when the rod 29 has been manually lifted through the medium of the chain 32, so that the float is carried to the top of the water in the tank, its lifting power is sufficiently great to hold the valve away from its seat until the water level has dropped sufficiently low to permit the valve head 19 to be again brought into contact with the pipe 12.

In the operation of the device, the chain is operated to pull up the rod 29 and thus open the valve, whereby the water in the tank will flow out through the casing 12. In the upward movement of the rod, the float is carried to the surface of the water, and will float thereon, descending as the level of the water falls so as to slowly close the valve. When so closed, the suction of the valve on the upper end of the casing, together with the weight of the ball serves to hold the valve in closed position while the tank is being filled.

What is claimed is:

In a flush tank, the combination with a flush pipe having a valve seat formed on its upper end, a valve head seated thereon, a pair of arms pivoted at one side of said flush pipe and above the valve seat, said arms being inclined downwardly to said valve head and carrying the latter in rigid relation, a float rod secured to and extending across said valve head from said arm and extending beyond the head, a float upon the forward end of said rod and means for actuating said rod to lift said valve head from its seat.

In testimony whereof, I affix my signature, in the presence of two witnesses.

GEORGE V. TOMAN.

Witnesses:
 IRVING DE MOTT,
 I. N. WYCKOFF.